(12) United States Patent
Hanson

(10) Patent No.: US 12,057,686 B2
(45) Date of Patent: Aug. 6, 2024

(54) FLEXIBLE CHANNEL MOLDING ASSEMBLIES

(71) Applicant: PPC BROADBAND, INC., East Syracuse, NY (US)

(72) Inventor: Brian K. Hanson, Cicero, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/845,699

(22) Filed: Jun. 21, 2022

(65) Prior Publication Data

US 2022/0320842 A1 Oct. 6, 2022

Related U.S. Application Data

(63) Continuation of application No. 16/903,022, filed on Jun. 16, 2020, now Pat. No. 11,368,004, which is a continuation of application No. 15/379,460, filed on Dec. 14, 2016, now Pat. No. 10,686,307.

(60) Provisional application No. 62/327,895, filed on Apr. 26, 2016, provisional application No. 62/267,159, filed on Dec. 14, 2015.

(51) Int. Cl.
   *H02G 3/04* (2006.01)
(52) U.S. Cl.
   CPC ......... *H02G 3/0475* (2013.01); *H02G 3/0431* (2013.01)
(58) Field of Classification Search
   CPC ...... B29C 33/34; B29C 33/36; H02G 3/0475; H02G 3/0468; H02G 3/34; H02G 3/06; H02G 3/0431; H02G 3/04; H02G 3/0487; H02G 11/00; H02G 11/006; F16L 3/015; G02B 6/4461; Y10T 403/32–32991; F16G 13/16; H01B 17/04
   See application file for complete search history.

(56) References Cited

U.S. PATENT DOCUMENTS

| | | |
|---|---|---|
| 5,332,866 A | 7/1994 | Sawamura |
| 5,445,569 A | 8/1995 | Blase |
| 5,836,148 A | 11/1998 | Fukao |
| 6,065,278 A | 5/2000 | Weber et al. |
| 6,550,232 B1 | 4/2003 | Achs et al. |
| 6,773,297 B2 | 8/2004 | Komiya |
| 6,984,782 B2 | 1/2006 | Ikeda et al. |
| 7,304,240 B1 | 12/2007 | Gretz |
| 2003/0016989 A1 | 1/2003 | Wentworth et al. |
| 2008/0251291 A1 | 10/2008 | Kadrnoska et al. |
| 2008/0264032 A1 | 10/2008 | Kitagawa et al. |
| 2017/0207612 A1 | 7/2017 | Handler |

FOREIGN PATENT DOCUMENTS

DE 202014465543 U1 12/2014

*Primary Examiner* — Roshn K Varghese
(74) *Attorney, Agent, or Firm* — MH2 TECHNOLOGY LAW GROUP LLP

(57) ABSTRACT

A flexible channel molding assembly may include a plurality of molding members. Each of the molding members defines a channel configured to receive a cable, and the plurality of molding members are configured to be pivotally coupled to one another along an axial direction to conform to a surface having a complex geometry.

18 Claims, 14 Drawing Sheets

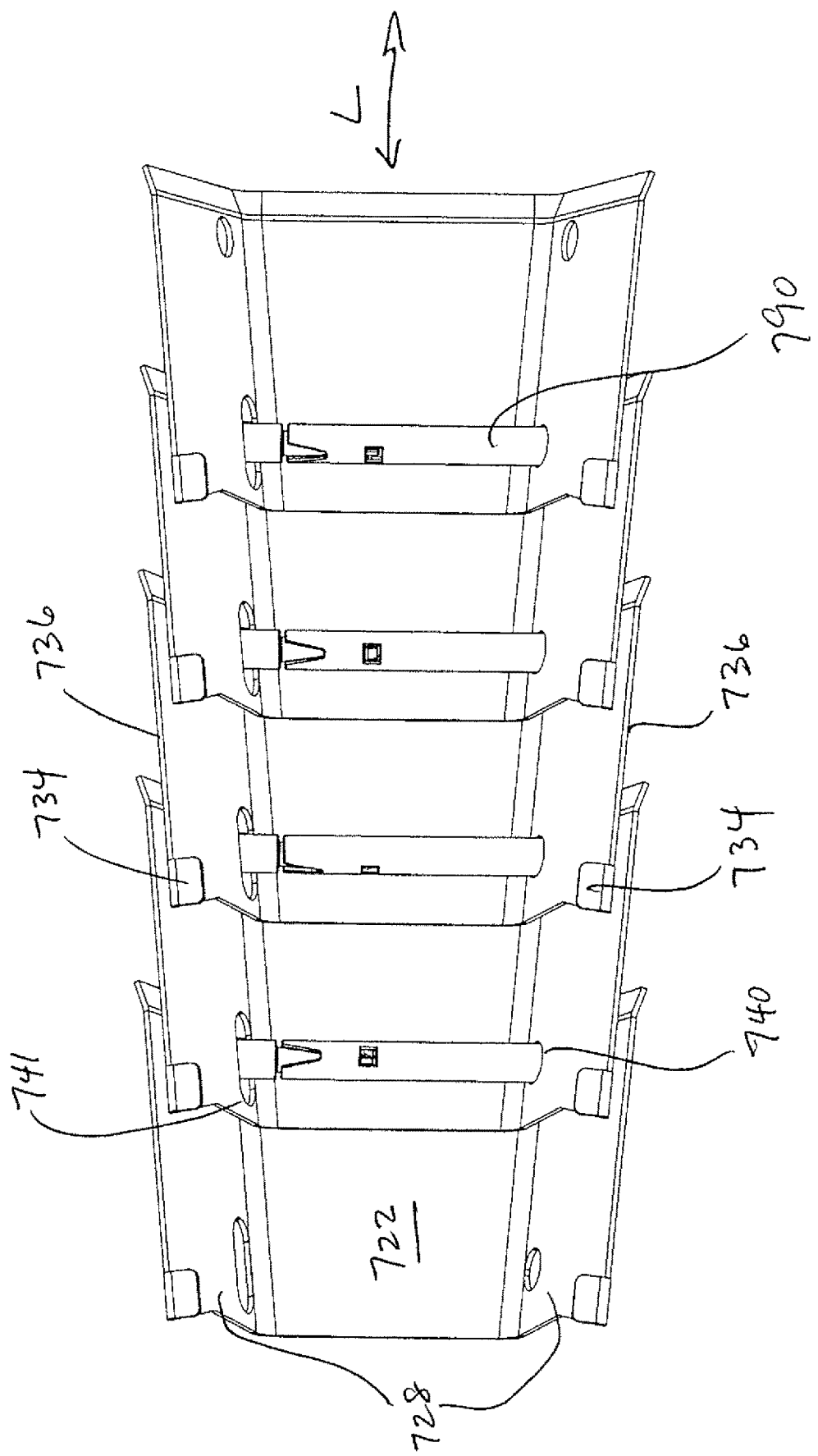

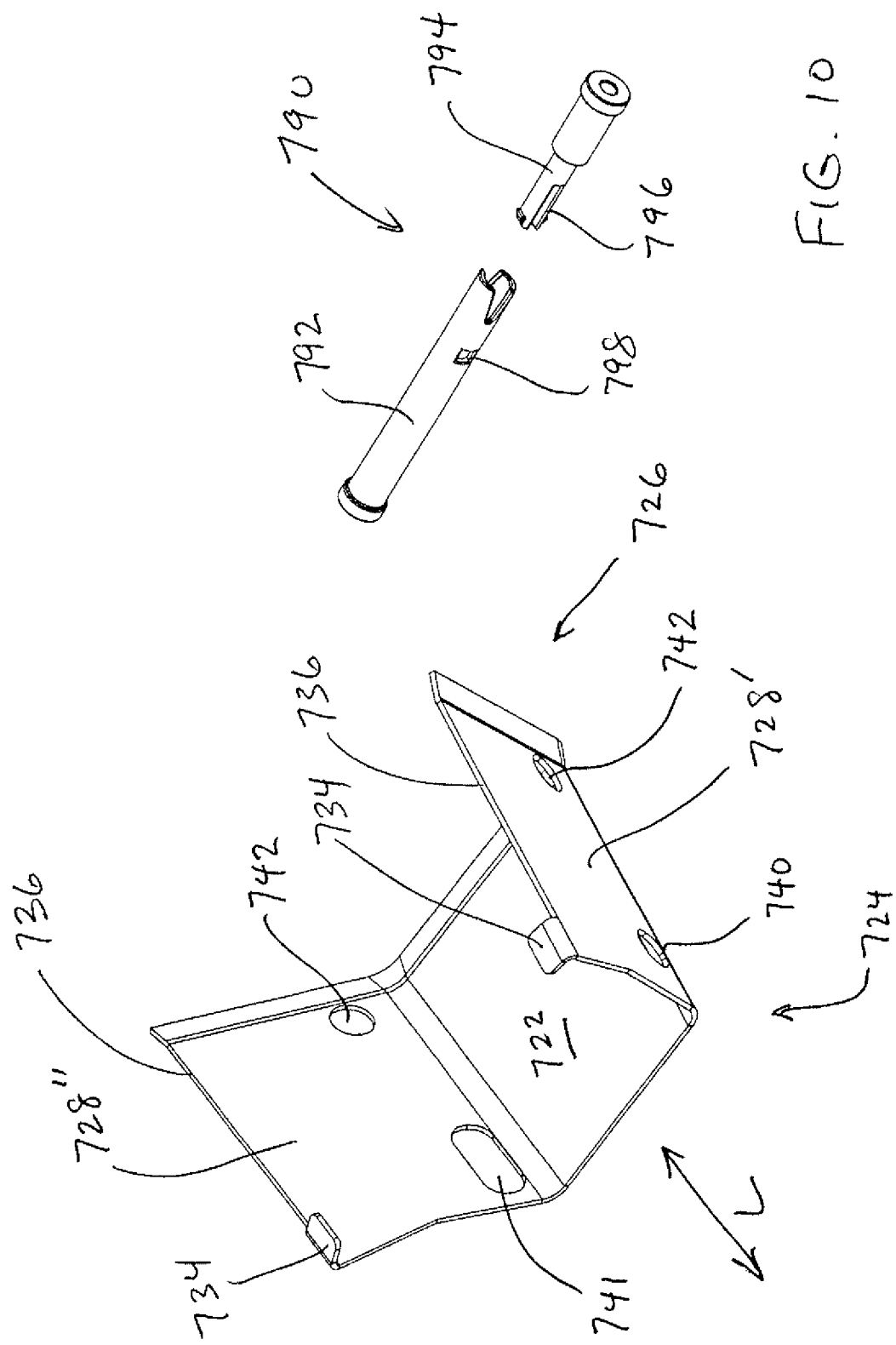

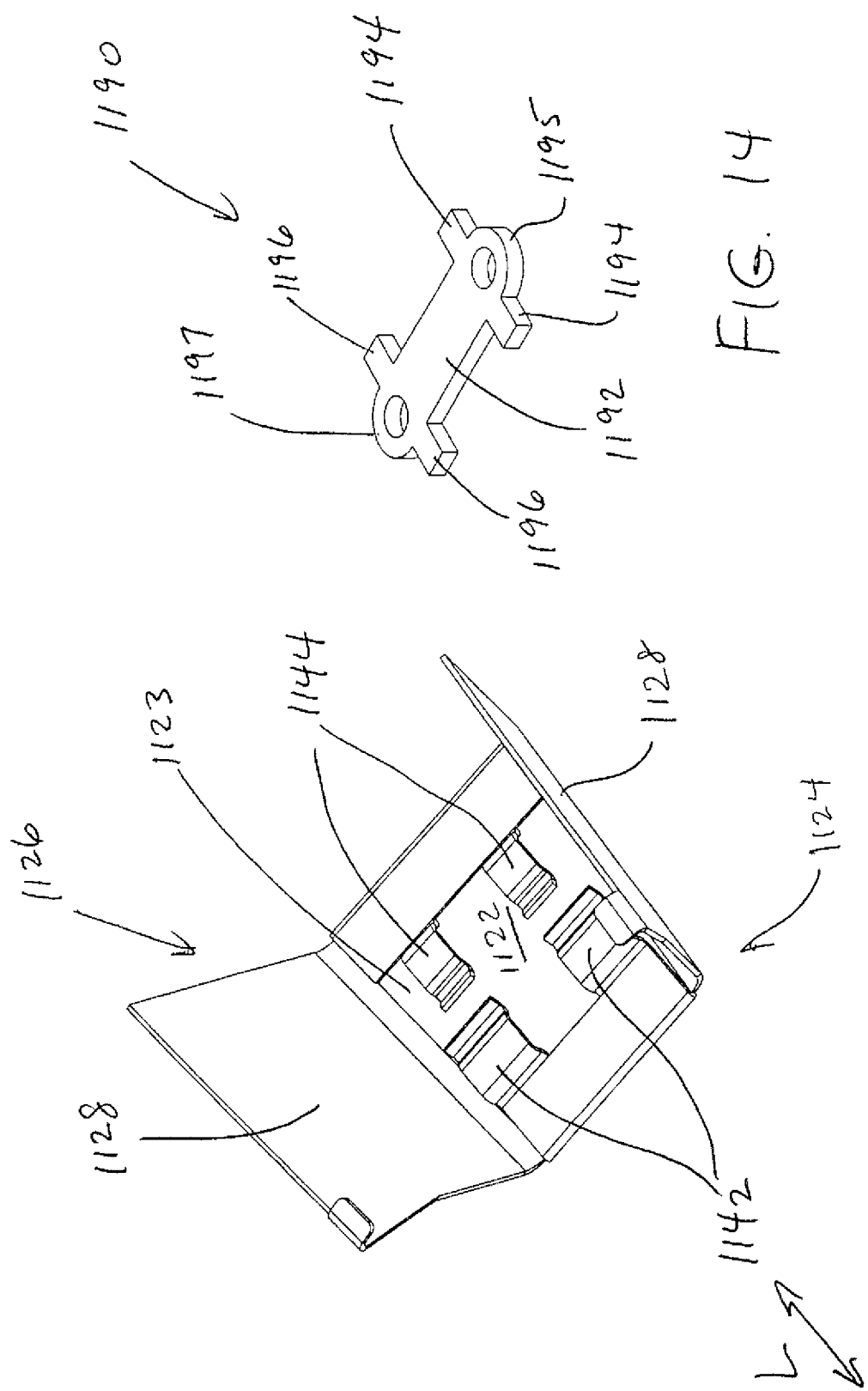

FLEXIBLE CHANNEL MOLDING ASSEMBLIES

CROSS-REFERENCE TO RELATED APPLICATIONS

This is a continuation of U.S. application Ser. No. 16/903,022, filed on Jun. 16, 2020, pending, which is a continuation of U.S. application Ser. No. 15/379,460, filed Dec. 14, 2016, now U.S. Pat. No. 10,686,307, which claims the benefit of U.S. Provisional Application No. 62/267,159, filed Dec. 14, 2015 and U.S. Provisional Application No. 62/327,895, filed Apr. 26, 2016, the disclosures of which are incorporated herein by reference.

BACKGROUND

This disclosure relates to a protective covering or enclosure for electrical cables and the like and, more particularly, to a protective molding assembly for running cables along a structure having a complex geometry.

It is known to provide protective covering systems for running electrical cables to, around, and in a building, particularly when it is necessary to extend the cable along an interior wall or floor surface. Various conventional cover systems have been designed with attempts to simplify their construction, reduce the time and labor necessary for installation of the cable and cover system, and provide a system that is as versatile as possible so as to be conformable for use with interior and exterior surfaces of a building.

Some conventional systems use a snap-together clip and cover assembly. Typically, the clip is the base member which is anchored to the wall surface and preferably as close as possible to a baseboard or other molding strip so as to blend with the trim or molding and not unduly detract from the appearance of the wall.

For installations where the wall surface includes complex geometries, such as outside corners, inside corners, and the like, conventional assemblies need to be premade in a custom design or formed from a large variety of modular components. In either case, conventional assemblies are not well-suited to handle installations involving complex geometries and result in greater cost and/or labor.

It is therefore an object of the present invention to provide for an improved protective cover assembly for electrical cables and the like that is economical to construct and install while being readily conformable for use in securing an electrical cable to wall or floor surfaces having various complex geometries.

SUMMARY

In accordance with various aspects of the disclosure, a flexible channel molding assembly may include a plurality of molding members. Each of the molding members defines a channel configured to receive a cable, and the plurality of molding members are configured to be pivotally coupled to one another along an axial direction to conform to a surface having a complex geometry.

Flexible channel molding assemblies according to the disclosure may further include a flexible backing plate, and the plurality of molding members may be configured to be coupled with the flexible backing plate to define an enclosed flexible channel molding assembly.

In some embodiments, each of the molding members may include a spine extending from a first end to a second end in a longitudinal direction L and two arms extending from opposite sides of the spine at an angle relative to the spine. In some aspects, the two arms may extend at an oblique angle so as to form a U-shaped configuration. In various aspects, a pair of mounting flanges extends from the opposite sides of the spine at the first end, wherein each of the mounting flanges includes an opening. According to some aspects, wherein a pair of second mounting flanges may extend from the opposite sides of the spine at the second end, wherein each of the second mounting flanges includes a second opening. In some aspects, the pair of mounting flanges and the pair of second mounting flanges are configured such that when two of the plurality of molding members are arranged second end to first end along the longitudinal direction L, the pair of second mounting flanges is configured to overlap the pair of mounting flanges.

In some embodiments, the flexible channel molding assembly may comprise a connector configured to couple the two of the plurality of molding members. In some aspects, the connector may be configured to be inserted through one of the openings and a respective one of the second openings to couple said two molding members together. According to various aspects, when coupled together, the two adjacent molding members are configured to be pivotable relative to one another and to others of said plurality of molding members. In some aspects, the two adjacent molding members may be configured to shape the flexible channel molding assembly to conform to a structure having a complex geometry. For example, the two adjacent molding members may be configured to shape the flexible channel molding assembly to conform to an outside corner and/or an inside corner.

According to various embodiments, the flexible channel molding assembly may include flanges that extend from ends of the arms of the molding members and a backing plate. The flanges may be configured to couple the molding members with the backing plate to define an enclosed flexible channel molding assembly.

BRIEF DESCRIPTION OF THE DRAWINGS

The above and other objects, advantages, and features of the present invention will become more readily appreciated and understood from a consideration of the following detailed description when taken together with the accompanying drawings, in which:

FIG. 8 is a bottom view of the exemplary flexible channel molding assembly for electrical cables of FIG. 7;

FIG. 9 is a perspective view of an exemplary molding member of the flexible channel molding assembly for electrical cables of FIG. 7;

FIG. 10 is a perspective view of an exemplary connector of the flexible channel molding assembly for electrical cables of FIG. 7;

FIG. 13 is a perspective view of an exemplary molding member of the flexible channel molding assembly for electrical cables of FIG. 11;

FIG. 14 is a perspective view of an exemplary connector of the flexible channel molding assembly for electrical cables of FIG. 11;

DETAILED DESCRIPTION OF EMBODIMENTS

Figure 3:
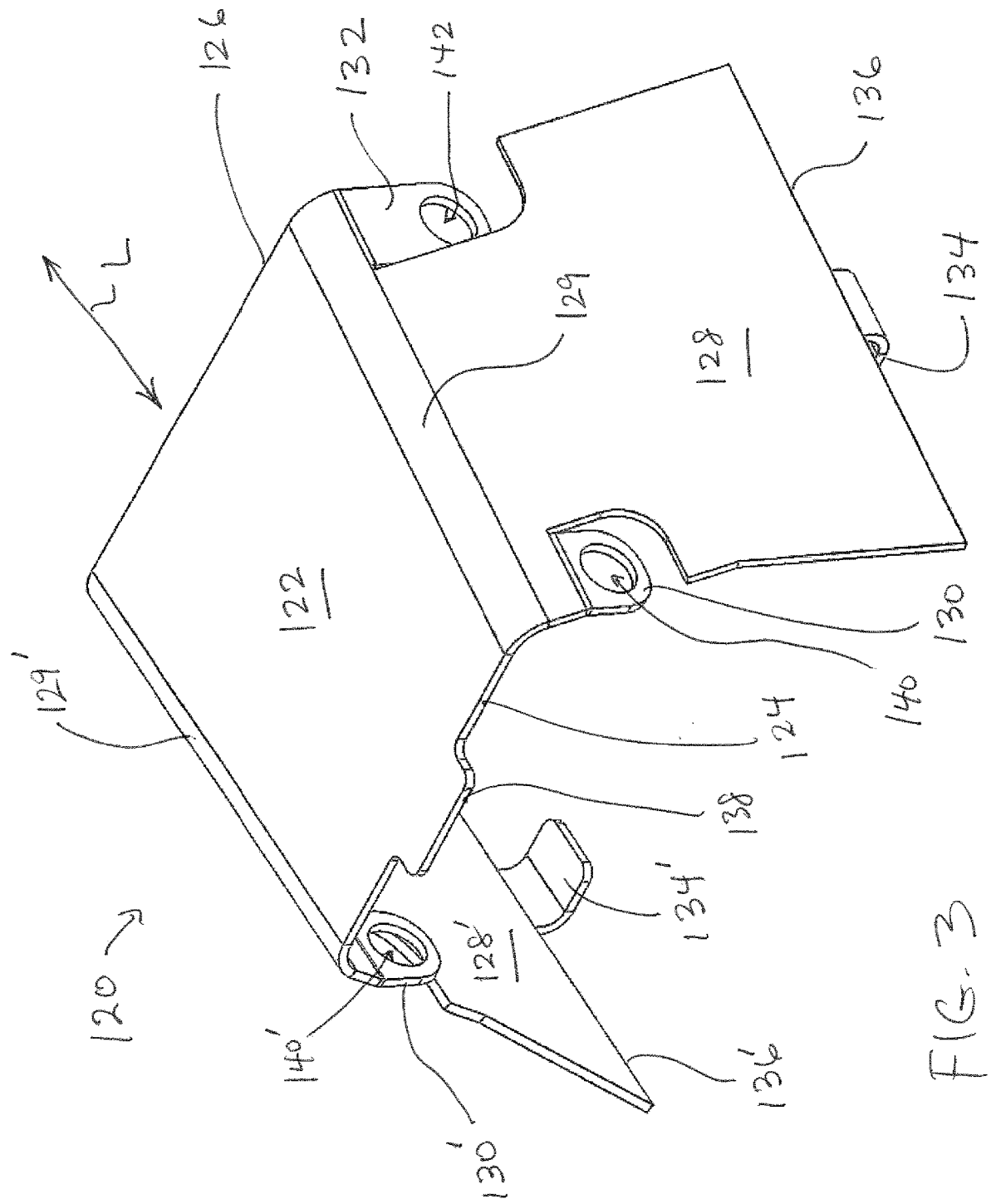
FIG. 3 is a perspective view of an exemplary molding member of the flexible channel molding assembly for electrical cables of FIG. 1.
Figure 4:
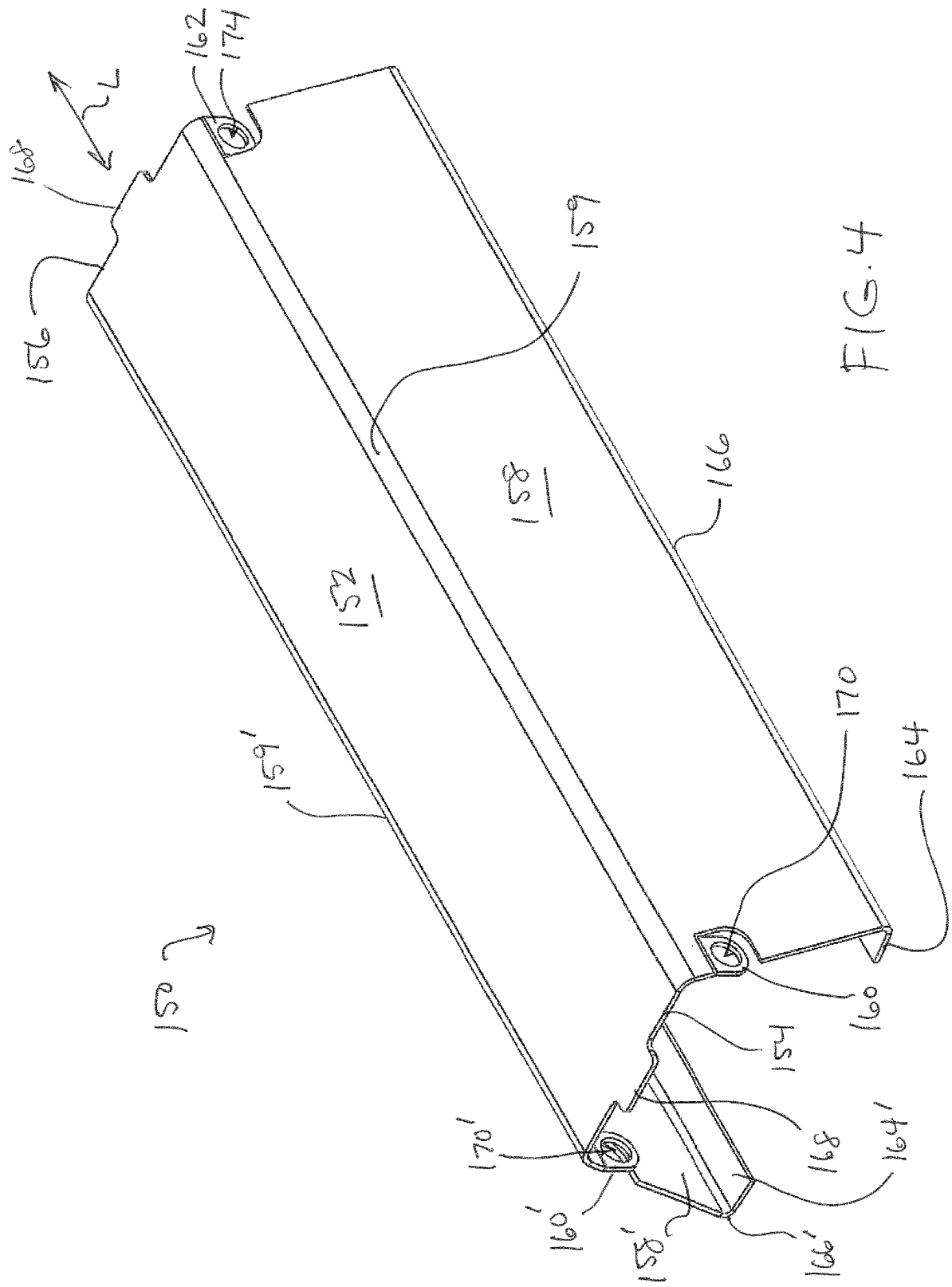
FIG. 4 is a perspective view of an exemplary end member of the flexible channel molding assembly for electrical cables of FIG. 1.
Figure 5:
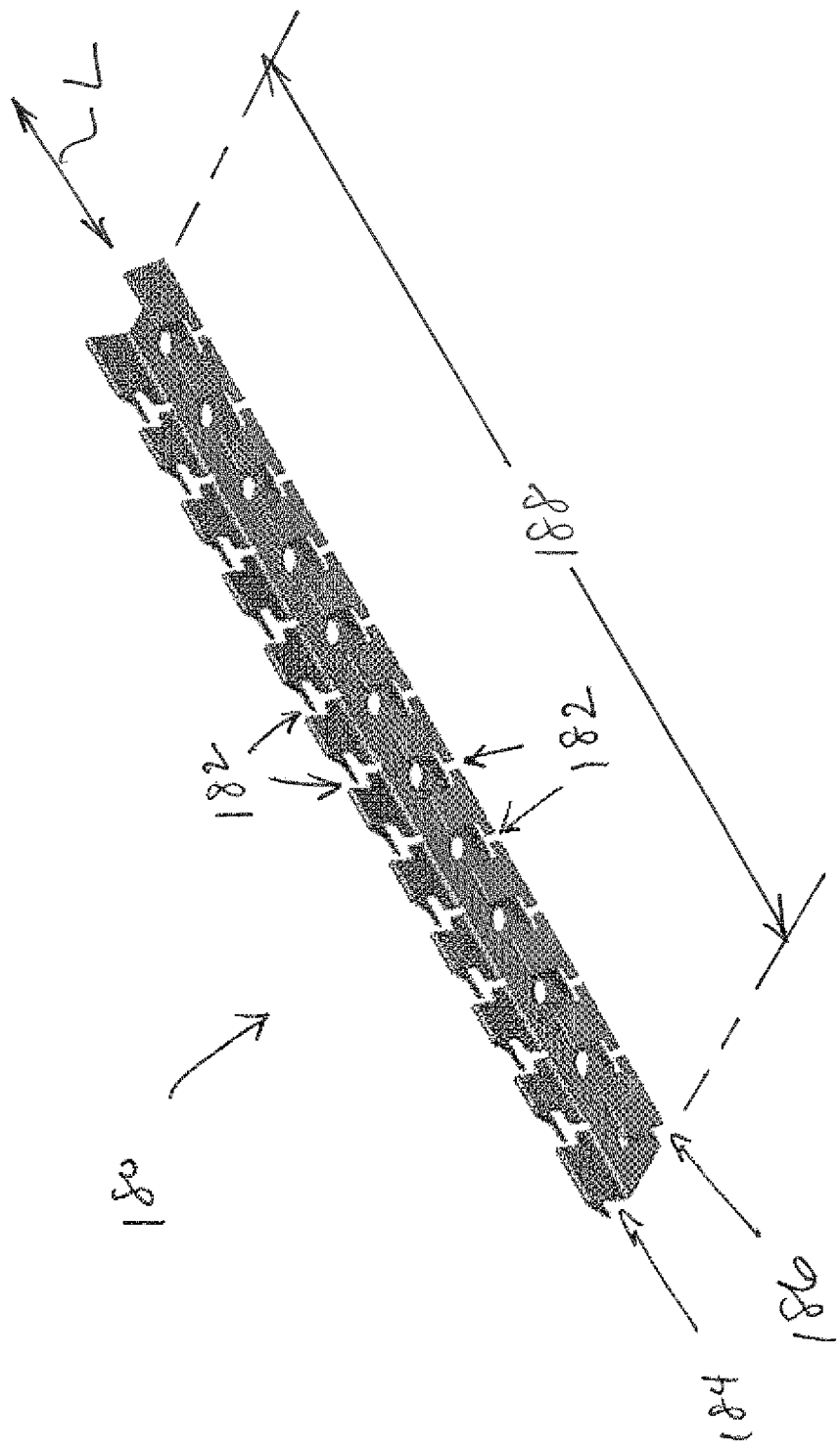
FIG. 5 is a perspective view of an exemplary backing plate for use with the flexible channel molding assembly for electrical cables of FIG. 1.
Figure 6:
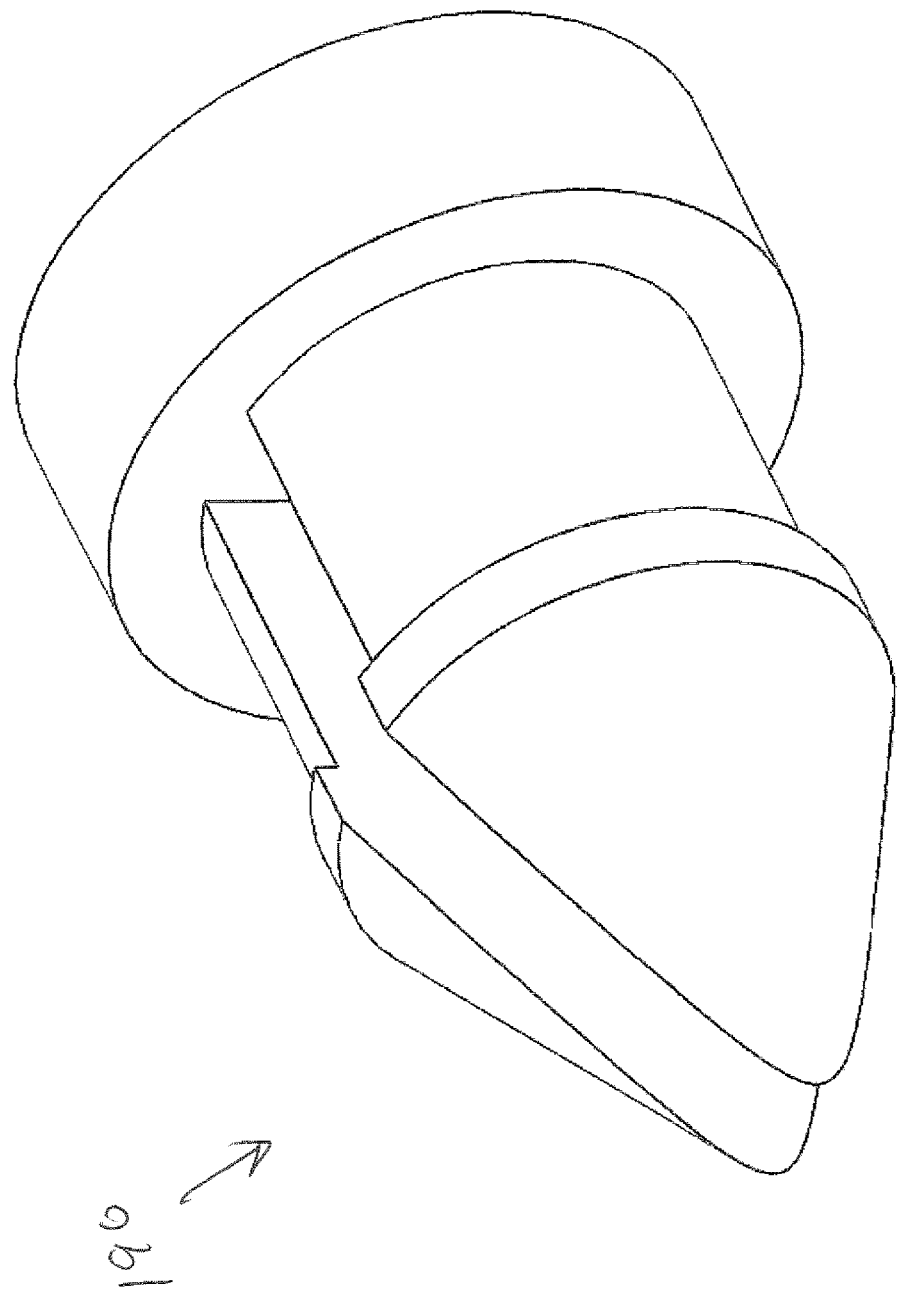
FIG. 6 is a perspective view of an exemplary connector for use with the flexible channel molding assembly for electrical cables of FIG. 1.

FIGS. 1-6 illustrate a protective channel molding or cover assembly 100 in accordance with various aspects of the disclosure. The channel molding assembly 100 includes a plurality of molding members 120 (FIG. 3), one or more elongated end members 150 (FIG. 4), and a backing plate 180 (FIG. 5). According to various aspects, the backing plate 180 may be configured as a flexible backing plate, for example. The flexibility of the backing plate 180 can be enhanced by notches 182 cut into the lateral edges 184, 186 of the backing plate 180, as shown in FIG. 5. The notches 182 can be spaced along a length 188 of the backing plate 180 according to a predetermined spacing pattern, for example, every one inch.

The molding members 120 may include a spine 122 extending from a first end 124 to a second end 126 in a longitudinal direction L and two arms 128, 128' extending from opposite sides 129, 129' of the spine 122 at an angle, for example, an oblique angle, relative to the spine 122 to form a substantially U-shaped configuration, as shown in FIG. 3. At the first end 124 of the spine 122, a pair of first mounting flanges 130, 130' extend from the opposite sides 129, 129' of the spine 122, and each of the first second flanges 130, 130' includes a first opening 140, 140'. At the second end 126 of the spine 122, a pair of second mounting flanges 132, 132' extends from the opposite sides 129, 129' of the spine 122, and each of the second mounting flanges 132, 132' includes a second opening 142, 142'.

The pairs of first and second mounting flanges 130, 130', 132, 132' are configured such that when two molding members 120 are arranged second end 126 to first end 124 along the longitudinal direction L, the pair of second mounting flanges 132, 132' can overlap the pair of first mounting flanges 130, 130'. A connector 190, such as that illustrated in FIG. 6, can be inserted through the openings 140, 140', 142, 142' in the first and second mounting flanges 130, 130', 132, 132' to couple the two molding members 120 together. The connector 190 may be configured as a peg or pin having, for example, a flange 192 defining a head end and two or more fingers 194 extending from the flange 194. The fingers 194 are flexible such that the fingers 194 can be radially deflected as they are inserted through one of the first and second openings 140, 140', 142, 142', while the flange 192 cannot be inserted through the openings 140, 140', 142, 142'. The fingers 194 may have a raised portion 196 that cooperates with the flange 192 to define an annular channel that can limit back-and-forth movement of the connector 190 relative to a respective mounting flange when the raised portion 196 is disposed on an opposite side of the mounting flange relative to the flange 192. When coupled together, the two adjacent molding members 120 may pivot relative to one another and other molding members in order to shape the flexible channel molding assembly 100 to conform to a structure having a complex geometry such as, for example, an outside corner, an inside corner, and/or the like.

As shown in FIG. 3, flanges 134, 134' may extend from ends 136, 136' of the arms 128, 128' opposite to where the arms 128, 128' extend from the spine 122. The flanges 134, 134' are configured to engage the lateral edges 184, 186 of the backing plate 180, for example, by clipping onto or snapping onto the lateral edges 184, 186, to couple the respective molding member 120 to the backing plate 180. A flange 138 may extend from the first end 124 of the spine 122 in the longitudinal direction L. The flange 138 can prevent overflexing of a channel molding assembly 100 that includes a plurality of molding members 120.

Referring now to FIG. 4, the elongated end members 150 may include a spine 152 extending from a first end 154 to a second end 156 in a longitudinal direction L and two arms 158, 158' extending from opposite sides of the spine 152 to form a substantially U-shaped configuration, as shown in FIG. 4. At the first end 154, a pair of first mounting flanges 160, 160' extend from opposite sides of the spine 152, and each of the first second flanges 160, 160' includes a first opening 170, 170'. At the second end 156, a pair of second mounting flanges 162, 162' extends from opposite sides of the spine 152, and each of the second mounting flanges 162, 162' includes a second opening 172. The pairs of first and second mounting flanges 160, 160', 162, 162' are configured such that when two molding members 150 are arranged second end 156 to first end 154 along the longitudinal direction L, the pair of second mounting flanges 162, 162' can overlap the pair of first mounting flanges 160, 160'. The connector 190, such as that illustrated in FIG. 6, can be inserted through the openings 170, 170', 172 in the first and second mounting flanges 160, 160', 162, 162' to couple the two molding members 150 together.

As shown in FIG. 4, flanges 164, 164' may extend from ends 166 of the arms 158, 158' opposite to where the arms 158, 158' extend from the spine 152. The flanges 164, 164' are configured to engage a surface of the backing plate 180 to couple the respective molding member 150 to the backing plate 180. Flanges 168, 168' may extend from the first end 154 and/or the second end 156 of the spine 152 in the longitudinal direction L. The flanges 168, 168' can prevent overflexing of a channel molding assembly 100 that includes a plurality of molding members 120.

Figure 1:
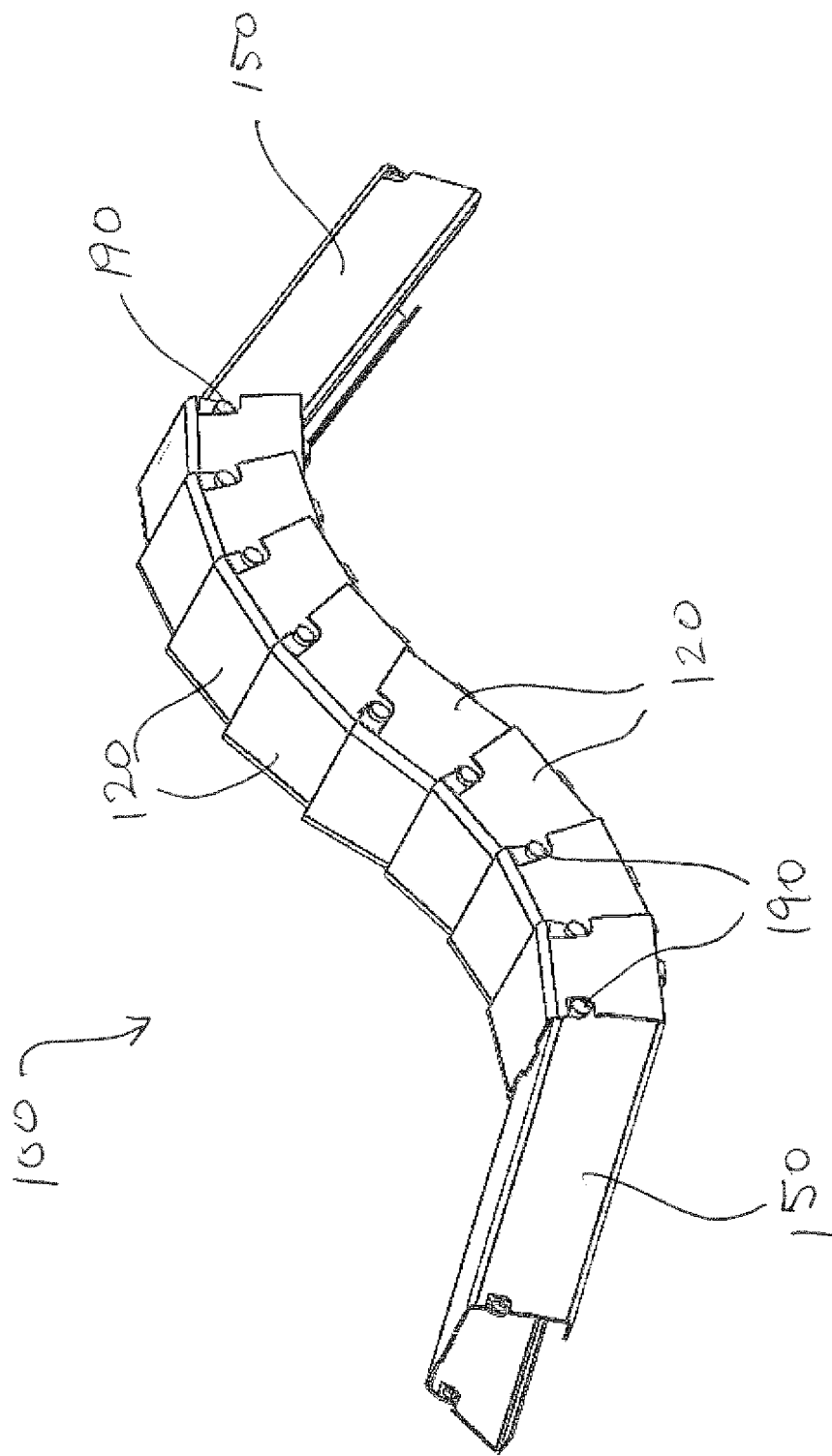
FIG. 1 is a perspective view of an exemplary flexible channel molding assembly for electrical cables in accordance with various aspects of the present disclosure.
Figure 2:
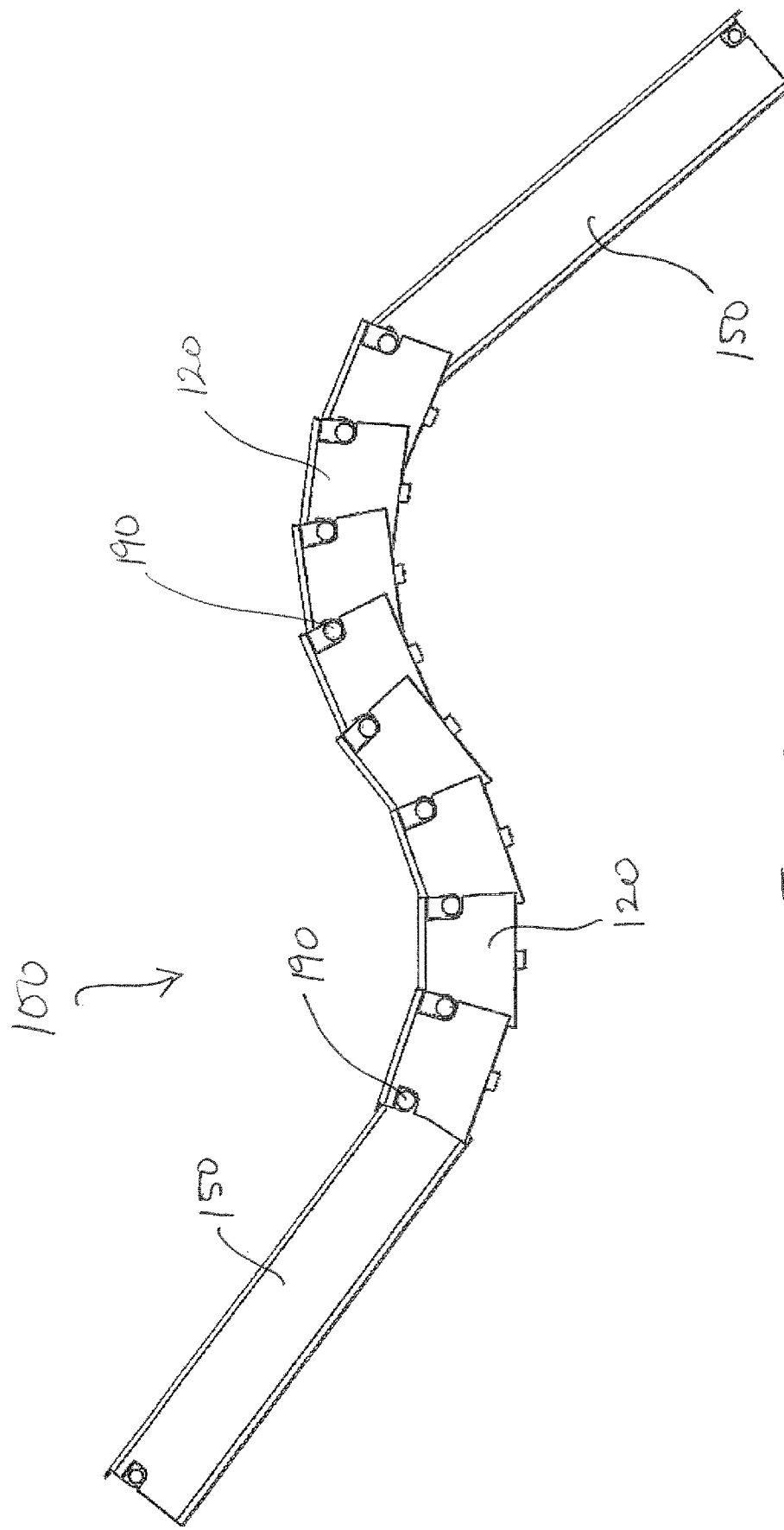
FIG. 2 is a side view of the exemplary flexible channel molding assembly for electrical cables of FIG. 1.

Referring now to FIGS. 1 and 2, a plurality of the molding members 120 can be assembled together with connectors 190 such that the resulting channel molding assembly 100 conforms to a desired shape and size of a structure (not shown) to which it will be attached. For example, the channel molding assembly 100 can be assembled together with connectors 190 to conform to a structure having an outside corner, an inside corner, and/or other complex geometries. Elongated end members 150 are assembled at regions of the channel molding assembly 100 where no angled or curved surfaces are present and can transition the channel molding assembly 100 from a complex geometry to a linear geometry.

In use, the flexible backing plate 180 is arranged in a desired geometry and affixed to the structure with nails, screws, or any other conventional attachment member. The plurality of molding members 120 and the elongated end members 150 are then attached to the backing plate 180 by engaging the flanges 134, 134', 164, 164' with a back side of the backing plate 180.

FIGS. 7-10 illustrate a protective channel molding or cover assembly 700 in accordance with various aspects of the disclosure. The channel molding assembly 700 includes a plurality of molding members 720 and a backing plate. The backing plate may comprise, for example, backing plate 180, discussed above, or backing plate 1580 (FIGS. 15-18), discussed in more detail below. According to various aspects, backing plate 180 and/or backing plate 1580 may be a flexible backing plate. In some embodiments, the channel molding assembly 700 may include one or more elongated end members (not shown).

The molding members 720 may include a spine 722 extending from a first end 724 to a second end 726 in a longitudinal direction L and two arms 728 extending from opposite sides of the spine 722 to form a substantially U-shaped configuration. At the first end 724, a first one 728' of the two arms 728 includes a first opening 740 and a second one 728" of the two arms 728 includes a slotted opening 741. At the second end 726, each of the two arms includes a second opening 742. The first opening 740, the slotted opening 741, and the second opening 742 are configured such that when two molding members 720 are arranged second end 726 to first end 724 along the longitudinal direction L such that the second end 726 of one molding member 720 overlaps the first end 724 of an adjacent molding member 720, the second openings 742 overlap the first opening 740 and slotted opening 741.

A connector 790, such as that illustrated in FIG. 10, can be inserted through the openings 740, 741, 742 in the two arms 728 to couple the two molding members 720 together. The connector 790 may comprise two connecting members 792, 794 that can be inserted through the openings 740, 741, 742 from opposite sides of the molding member 720. A first one of the connecting members 792 can be configured as a female member capable of receiving the second one of the connecting members 794 configured as a male member. The connecting members 792, 794 may include openings 798 and interlocking fingers 796, respectively, to secure their connection to one another.

When coupled together, the two adjacent molding members 720 may pivot relative to one another in two planes in order to shape the flexible channel molding assembly 700 to conform to a structure having a complex geometry such as, for example, an outside corner, an inside corner, and/or the like. For example, the two adjacent moldings 720 may be relatively pivotable about the connector 790 such that the molding members 720 can move up and down in a first plane that extends in the longitudinal direction L.

In addition, because the slotted opening 741 at the first end 724 of the molding member 720 is elongated in the longitudinal direction L, the connector 790 can move throughout the length of the slotted opening 741 in the longitudinal direction L. Thus, the second end 726 of an adjacent molding member 720 connected to the first end 724 of the molding member 720 by the connector 790 can also move with the connector 790. When the connector 790 is positioned at a middle of the slotted opening 741 in the longitudinal direction L, the molding members 720 form a straight configuration in the longitudinal direction L. Movement of the connector 790 through the length of the slotting opening 741 allows movement of the second end 726 of one molding member 720 relative to the first end 724 of an adjacent molding member 720 that permits the channel molding assembly 700 to bend left and right in a second plane that extends in the longitudinal direction L and is orthogonal to the first plane.

Referring now to FIGS. 15-18, flexible backing plate 1580 may include a plurality of backing members 1582 coupled to one another by connectors 1590. Each of the backing members 1582 includes a spine 1583 extending from a first end 1584 to a second end 1586 in a longitudinal direction L and two V-shaped arms 1588 extending from opposite sides of the spine 1583 to form a substantially U-shaped configuration. The V-shaped arms 1588 are compressible in a direction transverse to the longitudinal direction L.

The first end 1584 of each of the backing members 158, 158'2 includes a pair of first holding members 1585 spaced apart in the direction transverse to the longitudinal direction L, and the second end 1586 of each of the backing members 1582 includes a pair of second holding members 1587 spaced apart in the transverse direction. The first and second holding members 1585, 1587 may be configured as flange-like members that extend from the first and second ends 1584, 1586, respectively, toward a middle of the backing members 1582.

The connectors 1590 include a spine 1592 configured to extend in the longitudinal direction L of the backing plate 1580. To couple two adjacent backing members 1582, the connectors 1590 include a first pair of laterally-extending arms 1594 disposed near a first end 1595 of the spine 1592 and a second pair of laterally-extending arms 1596 disposed near a second end 1597 of the spine. The first holding members 1585 of one backing member 1582 are configured to receive the first pair of laterally-extending arms 1594 of a connector 1590, while the second holding members 1587 of an adjacent backing member 1582 are configured to receive the second pair of laterally-extending arms 1596 of the connector 1590. When coupling the two adjacent backing members 1582, the first end 1595 of the spine 1592 is disposed between the pair of first spaced apart holding members 1585, and the second end 1597 of the spine 1592 is disposed between the pair of second spaced apart holding members 1587.

The connectors 1590 may be constructed of a flexible material, such as, for example, synthetic rubber, including, but not limited to, nitrile, silicone, and ethylene propylene diene monomer (EPDM). Consequently, the connectors 1590 can bend in an up and down direction in a first plane that extends in the longitudinal direction L and in a left-right direction in a second plane that extends in the longitudinal direction L and is orthogonal to the first plane. The connectors 1590 may also be able to twist about a longitudinal axis of the spine 1592 extending in the longitudinal direction L. As a result, a backing plate 158 comprising a plurality of backing members 1582 coupled to one another by the connectors 1590 may be shaped to conform to a structure having a complex geometry such as, for example, an outside corner, an inside corner, and/or the like.

Referring again to FIGS. 7-9, flanges 734 may extend from ends 736 of the arms 728 opposite to the spine 722. The flanges 734 are configured to engage the V-shaped arms 1588 extending from opposite sides of the spine 1583 of the backing members 1582, for example, by clipping onto or snapping onto the V-shaped arms 1588, to couple the respective molding member 720 to the backing plate 1580. Also, the spine 722 and the arms 728 may be flared at the second end 724 of the molding member 720 to permit a desired amount of flexing of the channel molding assembly 700, while preventing overflexing of a channel molding assembly 700 that includes a plurality of molding members 720.

Figure 7:
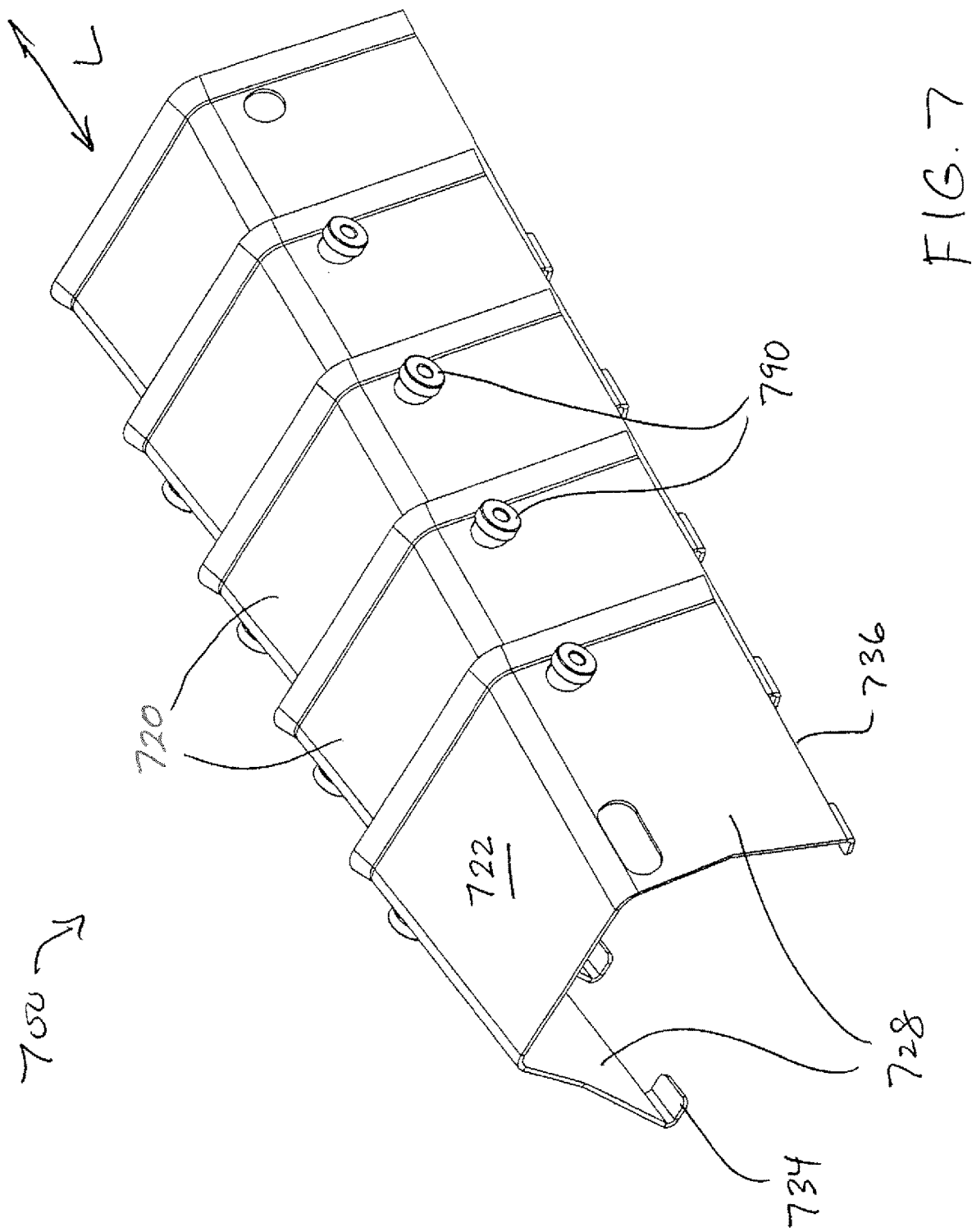
FIG. 7 is a perspective view of an exemplary flexible channel molding assembly for electrical cables in accordance with various aspects of the present disclosure.

Referring now to FIGS. 7 and 8, a plurality of the molding members 720 can be assembled together with connectors 790 such that the resulting channel molding assembly 700 can conform to a desired shape and size of a structure (not shown) to which it will be attached. For example, the channel molding assembly 700 can be assembled together with connectors 790 to conform to a structure having an outside corner, an inside corner, and/or any other complex geometries.

In use, the flexible backing plate 180, 1580 is arranged in a desired geometry and affixed to the structure with nails, screws, or any other conventional attachment member. For example, the plurality of molding members 720 and, optionally, elongated end members (not shown) are then attached to the backing plate 1580 by engaging the flanges 734 with the V-shaped arms 1588 of the backing plate 1580.

FIGS. 11-14 illustrate another embodiment of a protective channel molding or cover assembly 1100 in accordance with various aspects of the disclosure. The channel molding assembly 1100 includes a plurality of molding members 1120 and a backing plate, such as, for example, backing plate 180 or backing plate 1580, described above. In some embodiments, the channel molding assembly 1100 may include one or more elongated end members (not shown).

The molding members 1120 may include a spine 1122 extending from a first end 1124 to a second end 1126 in a longitudinal direction L and two arms 1128 extending from opposite sides of the spine 1122 to form a substantially U-shaped configuration. On an inside surface 1123 of the spine 1122, the first end 1124 of each of the molding members 1120 includes a pair of first holding members 1142 spaced apart in the direction transverse to the longitudinal direction L, and the second end 1126 of each of the molding members 1120 includes a pair of second holding members 1144 spaced apart in the transverse direction. The first and second holding members 1142, 1144 may be configured as flange-like members that extend from the first and second ends 1124, 1126, respectively, toward a middle of the molding member 1120.

The molding members 1120 are configured such that when two molding members 1120 are arranged second end 1126 to first end 1124 along the longitudinal direction L, the second end 1126 of one molding member 1120 overlaps the first end 1124 of an adjacent molding member 1120. Connectors 1190 may be configured to couple adjacent molding members 1120 to one another.

The connectors 1190 each include a spine 1192 configured to extend in the longitudinal direction L of the molding member 1120. To couple two adjacent molding members 1120, the connectors 1190 include a first pair of laterally-extending arms 1194 disposed near a first end 1195 of the spine 1192 and a second pair of laterally-extending arms 1196 disposed near a second end 1197 of the spine. The first holding members 1142 of one molding member 1120 are configured to receive the first pair of laterally-extending arms 1194 of a connector 1190, while the second holding members 1144 of an adjacent molding member 1120 are configured to receive the second pair of laterally-extending arms 1196 of the connector 1190. When coupling the two adjacent molding members 1120, the first end 1195 of the spine 1192 is disposed between the pair of first spaced apart holding members 1142, and the second end 1197 of the spine 1192 is disposed between the pair of second spaced apart holding members 1144.

The connectors 1190 may be constructed of a flexible material, such as, for example, synthetic rubber, including, but not limited to, nitrile, silicone, and ethylene propylene diene monomer (EPDM). Consequently, the connectors 1190 can bend in an up and down direction in a first plane that extends in the longitudinal direction L and in a left-right direction in a second plane that extends in the longitudinal direction L and is orthogonal to the first plane. The connectors 1190 may also be able to twist about a longitudinal axis of the spine 1192 extending in the longitudinal direction L. As a result, the molding assembly 1100 comprising a plurality of molding members 1120 coupled to one another by the connectors 1190 may be shaped to conform to a structure having a complex geometry such as, for example, an outside corner, an inside corner, and/or the like.

Referring again to FIGS. 11-13, flanges 1134, 134' may extend from ends 1136 of the arms 1128 opposite to the spine 1122. The flanges 1134 are configured to engage the V-shaped arms 1588 extending from opposite sides of the spine 1583 of the backing members 1582, for example, by clipping onto or snapping onto the V-shaped arms 1588, to couple the respective molding member 1120 to the backing plate 1580.

Figure 11:
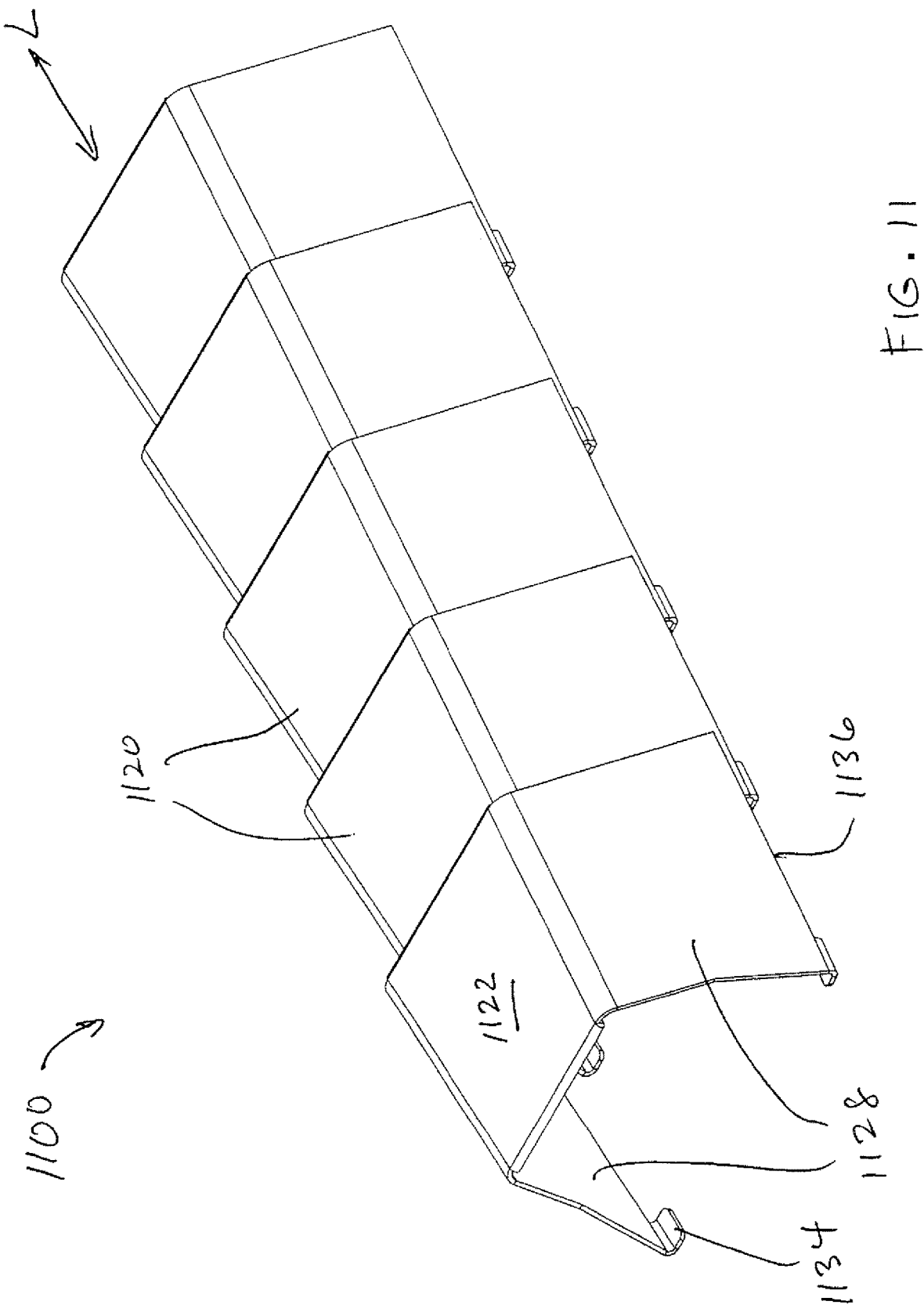
FIG. 11 is a perspective view of an exemplary flexible channel molding assembly for electrical cables in accordance with various aspects of the present disclosure.
Figure 12:
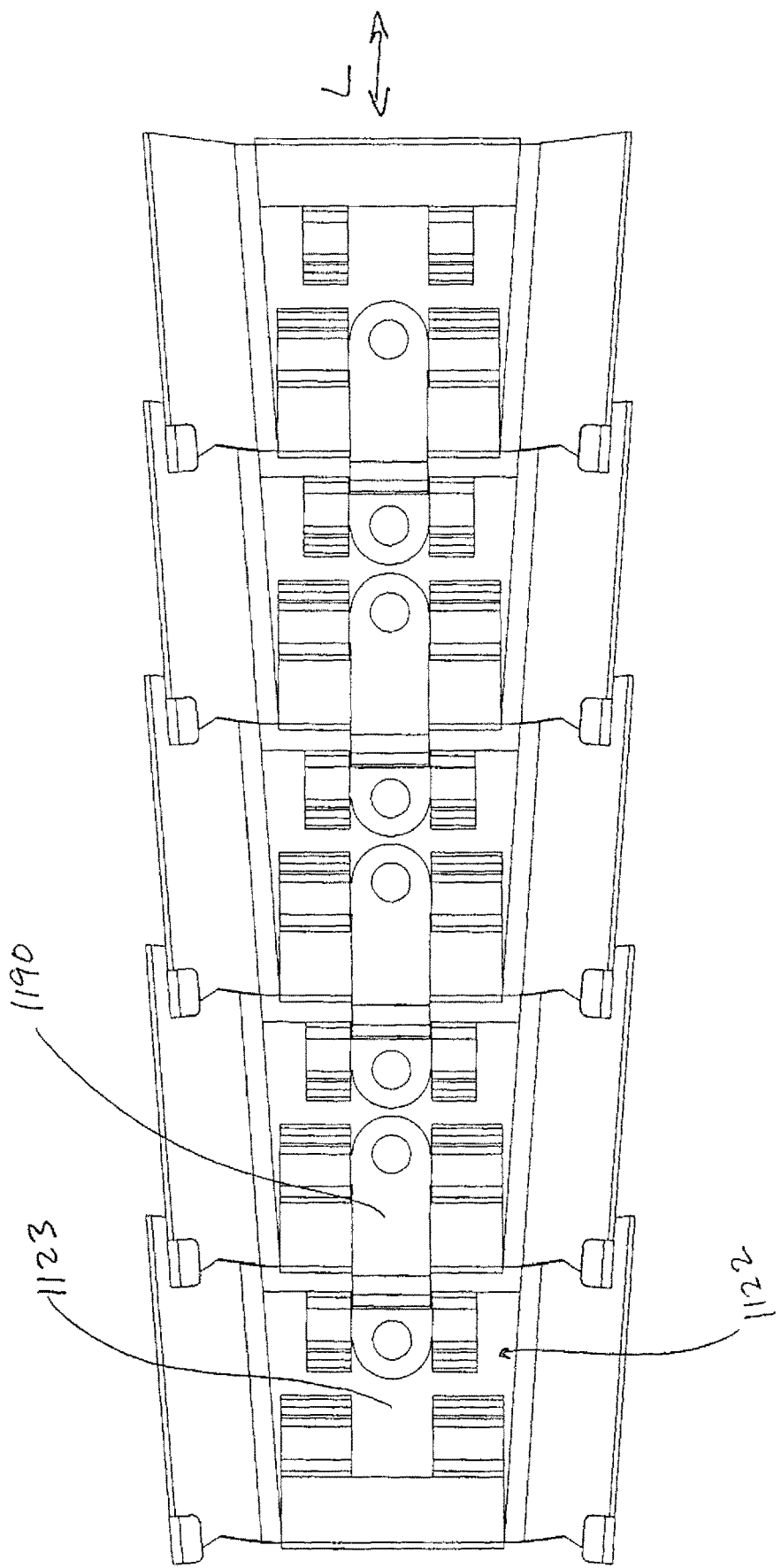
FIG. 12 is a bottom view of the exemplary flexible channel molding assembly for electrical cables of FIG. 11.
Figure 15:
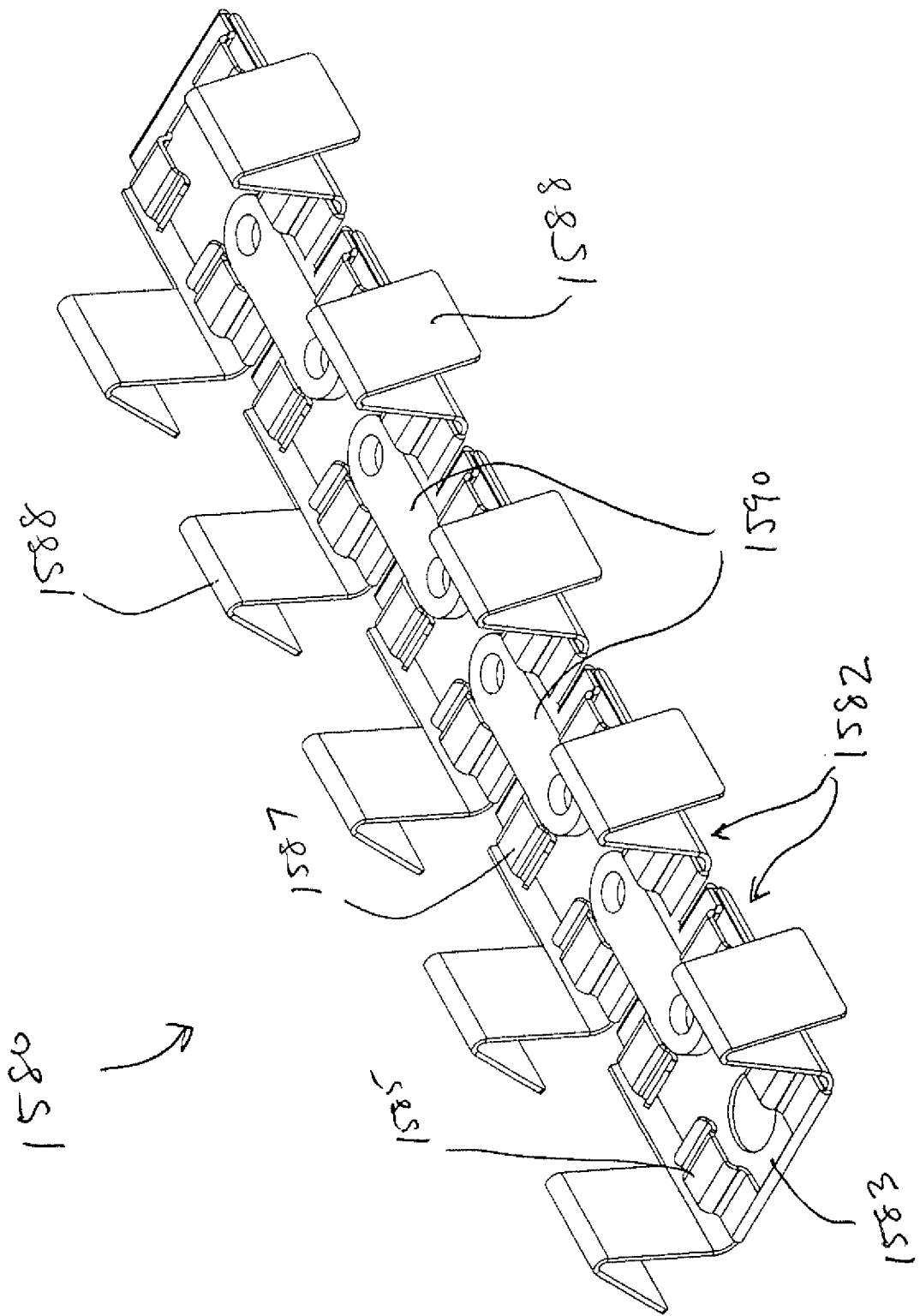
FIG. 15 is a perspective view of an exemplary backing plate of a flexible channel molding assembly for electrical cables in accordance with various aspects of the present disclosure.
Figure 16:
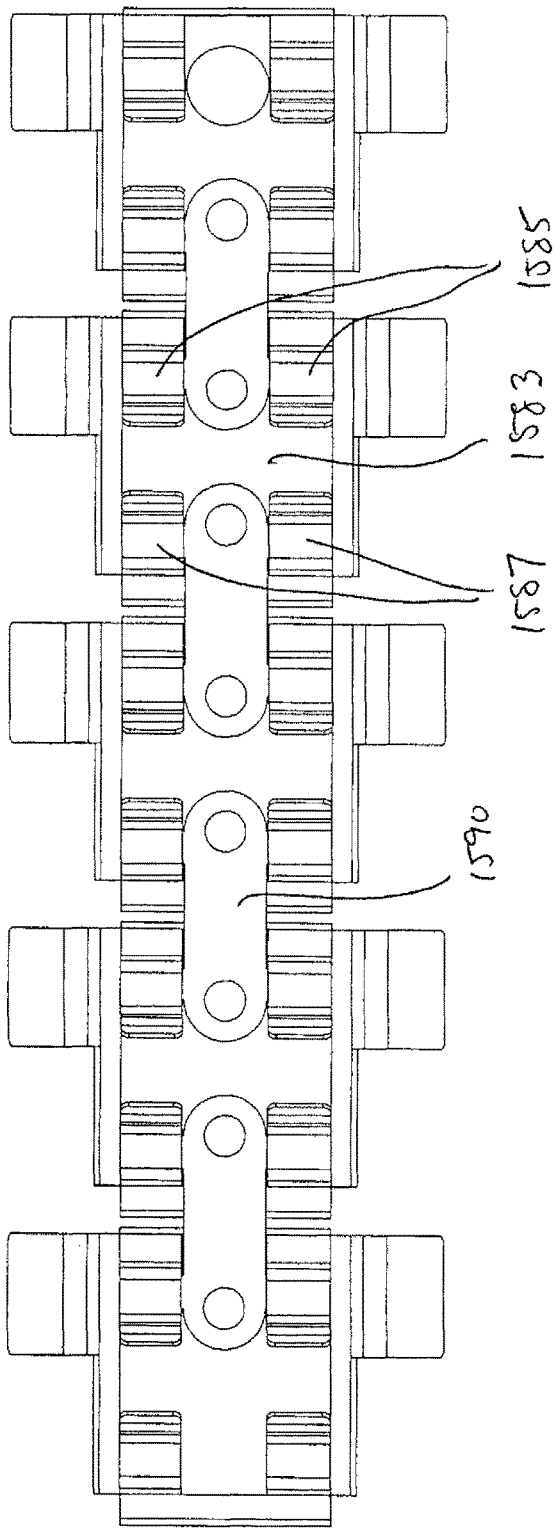
FIG. 16 is a top view of the backing plate of FIG. 15.
Figure 18:
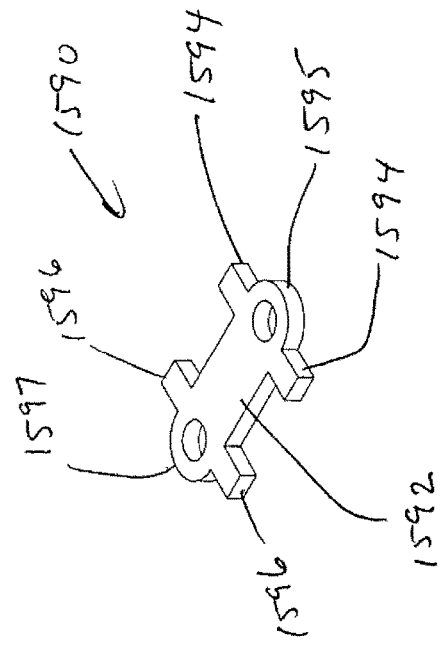
FIG. 18 is a perspective view of an exemplary connector of the backing plate of FIG. 15.
Figure 17:
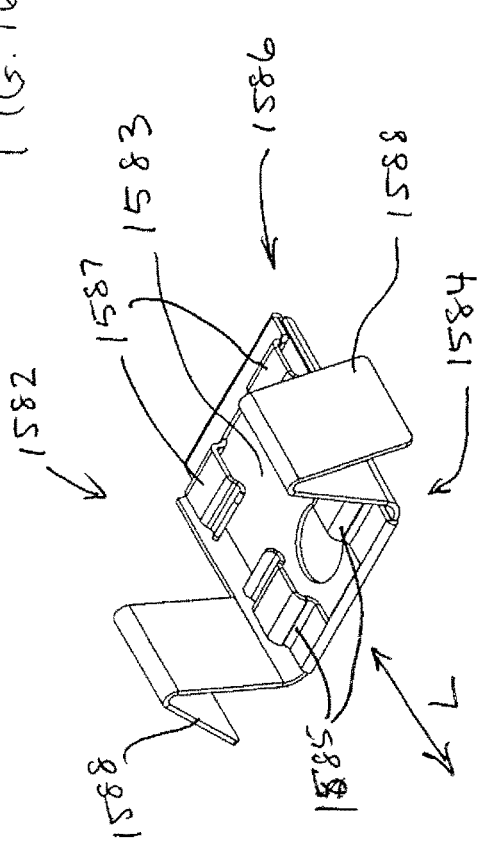
FIG. 17 is a perspective view of an exemplary backing member of the backing plate of FIG. 15.

Referring now to FIGS. 11 and 12, a plurality of the molding members 1120 can be assembled together with the connectors 1190 such that the resulting channel molding assembly 1100 can conform to a desired shape and size of a structure (not shown) to which it will be attached. For example, the channel molding assembly 1100 can be assembled together with the connectors 1190 to conform to a structure having an outside corner, an inside corner, and/or any other complex geometries.

In use, the flexible backing plate 180, 1580 is arranged in a desired geometry and affixed to the structure with nails, screws, or any other conventional attachment member. For example, the plurality of molding members 1120 and, optionally, elongated end members (not shown) are then attached to the backing plate 1580 by engaging the flanges 1134 with the V-shaped arms 1588 of the backing plate 1580.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A cable cover configured to conform to a surface having a non-linear geometry that includes a bend, comprising:
   a receiving portion structurally configured to receive a cable;
   a connecting portion separate from the receiving portion and structurally configured to be coupled with the receiving portion;
   wherein the receiving portion includes a middle portion extending from a first end to a second end in a longitudinal direction and having two opposite sides that extend from the first end to the second end;
   wherein the receiving portion includes two side portions extending from the two opposite sides of the middle portion at an oblique angle when viewing the first end in a plan view to form a substantially U-shaped configuration;
   wherein a first surface of the middle portion includes a pair of first connection portion receiving portions at the first end and a pair of second connection portion receiving portions at the second end, the first connection portion receiving portions being spaced apart from one another in a lateral direction relative to the longitudinal direction, and the second connection portion receiving portions being spaced apart from one another in the lateral direction;
   wherein each of the first connection portion receiving portions includes a connection portion receiving portion that is spaced from the first surface of the middle portion and extends from the first end toward a middle of the receiving portion, and each of the second connection portion receiving portions includes a connection portion receiving portion that is spaced from the first surface of the middle portion and extends from the second end toward the middle of the receiving portion;
   wherein the connection portion includes a pair of first extension portions near a first end of the middle portion of the connection portion that extend laterally relative to the longitudinal direction and a pair of second extension portions near a second end of the middle portion of the connection portion that extend laterally relative to the longitudinal direction;
   wherein the second connection portion receiving portions of the receiving portion are structurally configured to receive the first extension portions of the connection portion, and the second extension portions of the connection portion are structurally configured to be received by first connection portion receiving portions of the second same receiving portions;
   wherein the first end of the middle portion of the connection portion is structurally configured to be disposed between the second connection portion receiving portions of the receiving portion and the second end of the middle portion of the connection portion is structurally configured to be disposed between the first connection portion receiving portions of the second same receiving portion when the connection portion couples the receiving portion with the second same receiving portion; and
   wherein the connection portion is structurally configured to permit the receiving portion to pivot relative to the second same receiving portion along an axial direction so as to conform to a surface having a non-linear geometry that includes a bend.

2. The cable cover of claim 1, further comprising a base portion; and
   wherein the receiving portion is structurally configured to be coupled with the base portion to define an enclosed cable cover.

3. The cable cover of claim 2, further comprising coupling portions extending from ends of the two side portions of the receiving portion; and
   wherein the coupling portions are structurally configured to couple the receiving portion with the base portion to define the enclosed cable cover.

4. The cable cover of claim 2, wherein the second end of the receiving portion is structurally configured to overlap the first end of the second same receiving portion when the receiving portion is arranged adjacent to the second same receiving portion with the second end of the receiving portion at a first end of the second same receiving portion along the longitudinal direction.

5. A cable cover configured to conform to a surface having a non-linear geometry that includes a bend, comprising:
   a receiving portion structurally configured to receive a cable;
   a connection portion structurally configured to be coupled with the receiving portion;
   wherein the receiving portion includes a middle portion extending from a first end to a second end in a longitudinal direction and two side portions extending from two opposite sides of the middle portion at an oblique angle when viewing the first end in a plan view;
   wherein a first surface of the middle portion includes a pair of first connection portion receiving portions at the first end and a pair of second connection portion receiving portions at the second end;
   wherein the connection portion includes a pair of first extension portions near the first end that extend laterally relative to the longitudinal direction and a pair of second extension portions near the second end that extend laterally relative to the longitudinal direction;
   wherein the second connection portion receiving portions of the receiving portion are structurally configured to receive the first extension portions of the connection portion, and the second extension portions of the connection portion are structurally configured to be received by first connection portion receiving portions of a second same receiving portion; and
   wherein the connection portion is structurally configured to permit the receiving portion to pivot relative to the second same receiving portion along an axial direction so as to conform to a surface having a non-linear geometry that includes a bend.

6. The cable cover of claim 5, wherein the first connection portion receiving portions are spaced apart from one another in a lateral direction relative to the longitudinal direction, and the second connection portion receiving portions are spaced apart from one another in the lateral direction;
   wherein each of the first connection portion receiving portions includes a connection portion receiving portion that is spaced from the first surface of the middle portion and extends from the first end toward a middle of the receiving portion, and each of the second connection portion receiving portions includes a connection portion receiving portion that is spaced from the first surface of the middle portion and extends from the second end toward the middle of the receiving portion; and wherein the first end of the connection portion is structurally configured to be disposed between the second connection portion receiving portions of the receiving portion, and the second end of the connection portion is disposed between first connection portion receiving portions of the second same receiving portion when the connection portion couples the receiving portion with the second same receiving portion.

7. The cable cover of claim 5, wherein the second end of the receiving portion is structurally configured to overlap the first end of the second same receiving portion when the receiving portion is arranged with the second end at a first end of the second same receiving portion along the longitudinal direction.

8. The cable cover of claim 5, further comprising a base portion; and wherein the receiving portion is structurally configured to be coupled with the base portion to define an enclosed cable cover.

9. The cable cover of claim 8, further comprising coupling portions extending from ends of the two side portions of the receiving portion; and wherein the coupling portions are structurally configured to couple the receiving portion with the base portion to define the enclosed cable cover.

10. The cable cover of claim 8, wherein the base portion includes a plurality of base portion members, wherein each of the base portion members includes a middle portion extending from a first end of the base portion member to a second end of the base portion member in a longitudinal direction and two opposite sides that extend from the first end of the base portion member to the second end of the base portion member, and wherein each of the base portion members includes two extension portions extending from the two opposite sides of the middle portion of the base portion member at an oblique angle.

11. The cable cover of claim 10, further comprising coupling portions extending from ends of the two side portions of the receiving portion; and wherein the coupling portions are structurally configured to couple the receiving portion with the extension portions of the base portion members to define the enclosed cable cover.

12. A cable cover configured to conform to a surface having a non-linear geometry that includes a bend, comprising:

a receiving portion structurally configured to receive a cable;

a connection portion structurally configured to be coupled with the receiving portion;

wherein the receiving portion includes a middle portion extending from a first end to a second end in a longitudinal direction and two side portions extending from two opposite sides of the middle portion at an oblique angle when viewing the first end in a plan view;

wherein a first surface portion of the middle portion includes a pair of first connection portion receiving portions at the first end and a pair of second connection portion receiving portions at the second end;

wherein each of the connection portions includes a pair of first extension portions near the first end that are structurally configured to extend laterally relative to the longitudinal direction and a pair of second extension portions near the second end that are structurally configured to extend laterally relative to the longitudinal direction;

wherein the second connection portion receiving portions are structurally configured to receive the first extension portions of the connection portion, and the second extension portions of the connection portion are structurally configured to be received by first connection portion receiving portions of a second same receiving portion; and wherein the connection portion is structurally configured to permit the receiving portion to pivot relative to the second same receiving portion so as to conform to a surface having a non-linear geometry that includes a bend.

13. The cable cover of claim 12, wherein the first connection portion receiving portions are spaced apart from one another in a lateral direction relative to the longitudinal direction, and the second connection portion receiving portions are spaced apart from one another in the lateral direction;

wherein each of the first connection portion receiving portions is spaced from the first surface of the middle portion and extends from the first end toward a middle of the receiving portion, and each of the second connection portion receiving portions is spaced from the first surface of the middle portion and extends from the second end toward the middle of the receiving portion; and wherein the first end of the middle portion of the connection portion is structurally configured to be disposed between the second connection portion receiving portions of the receiving portion, and the second end of the middle portion of the connection portion is structurally configured to be disposed between first connection portion receiving portions of the second same receiving portion when the connection portion couples the receiving portion with the second same receiving portion.

14. The cable cover of claim 12, wherein the second end of the receiving portion is structurally configured to overlap the first end of the second same receiving portion when the receiving portion is arranged with the second end at a first end of the second same receiving portion along the longitudinal direction.

15. The cable cover of claim 12, further comprising a base portion; and wherein the receiving portion is structurally configured to be coupled with the base portion to define an enclosed cable cover.

16. The cable cover of claim 15, further comprising coupling portions extending from ends of the two side portions of the receiving portion; and wherein the coupling portions are structurally configured to couple the receiving portion with the base portion to define the enclosed cable cover.

17. The cable cover of claim 15, wherein the base portion includes a plurality of base portion members;

wherein each of the base portion members includes a middle portion extending from a first end of the base portion member to a second end of the base portion member in a longitudinal direction and two opposite sides that extend from the first end of the base portion member to the second end of the base portion member; and wherein each of the base portion members includes two extension portions extending from the two opposite sides of the middle portion of the base portion member at an oblique angle.

18. The cable cover of claim 17, further comprising coupling portions extending from ends of the two side portions of the receiving portion; and wherein the coupling portions are structurally configured to couple the receiving portion with the extension portions of the base portion members to define the enclosed cable cover.

* * * * *